(12) United States Patent
Yano et al.

(10) Patent No.: US 10,167,009 B2
(45) Date of Patent: Jan. 1, 2019

(54) ELECTRIC POWER STEERING SYSTEM

(71) Applicant: JTEKT CORPORATION, Osaka-shi, Osaka (JP)

(72) Inventors: Hiroshi Yano, Kashiba (JP); Hiroshi Negoro, Kashihara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/598,884

(22) Filed: May 18, 2017

(65) Prior Publication Data

US 2017/0341680 A1    Nov. 30, 2017

(30) Foreign Application Priority Data

May 25, 2016 (JP) .................... 2016-104557
Oct. 25, 2016 (JP) .................... 2016-208880

(51) Int. Cl.
*B62D 5/04* (2006.01)
*B62D 3/12* (2006.01)

(52) U.S. Cl.
CPC ............ *B62D 5/04* (2013.01); *B62D 3/12* (2013.01); *B62D 5/0421* (2013.01)

(58) Field of Classification Search
CPC ............................ B62D 5/0421; B62D 5/04
USPC ........................................................ 180/444
See application file for complete search history.

(56) References Cited

U.S. PATENT DOCUMENTS

| 2006/0108174 | A1* | 5/2006 | Saito | B62D 5/0403 180/444 |
| 2007/0193819 | A1* | 8/2007 | Iwasa | B62D 5/0409 180/444 |
| 2011/0120798 | A1* | 5/2011 | Kawada | B62D 1/16 180/444 |
| 2013/0161114 | A1* | 6/2013 | Bando | B62D 5/04 180/443 |
| 2016/0090117 | A1* | 3/2016 | Murakami | B62D 5/04 180/444 |

FOREIGN PATENT DOCUMENTS

| DE | 10 2011 001 217 A1 | 9/2012 |
| GB | 2524605 A | 9/2015 |
| JP | H10-258749 A | 9/1998 |

OTHER PUBLICATIONS

Oct. 26, 2017 Extended European Search Report issued in European Patent Application No. EP 17171989.1.

\* cited by examiner

*Primary Examiner* — Tony H Winner
(74) *Attorney, Agent, or Firm* — Oliff PLC (57) ABSTRACT

An electric power steering system includes a rack housing configured to accommodate a rack shaft, a pinion shaft meshed with the rack shaft, a speed-reducer including a worm wheel connected to a portion of the second pinion shaft protruding from the rack housing, a speed-reducer housing configured to accommodate the speed-reducer, and a seal member having an annular shape. The seal member is disposed closer to the second pinion gear than the worm wheel is, in the speed-reducer housing. The sear member seals a clearance between the second pinion shaft and the speed-reducer housing.

12 Claims, 7 Drawing Sheets

ELECTRIC POWER STEERING SYSTEM

INCORPORATION BY REFERENCE

The disclosure of Japanese Patent Application No. 2016-104557 filed on May 25, 2016 and Japanese Patent Application. No. 2016-208880 filed on Oct. 25, 2016, each including the specification, drawings and abstract, is incorporated herein by reference in its entirety.

BACKGROUND OF THE INVENTION

1. Field of the Invention

The invention relates to an electric power steering system.

2. Description of Related Art

A steering gearbox of an electric power steering system described in Japanese Patent Application Publication No. 10-258749 (JP 10-258749 A) includes a housing, a rack shaft, a pinion shaft, and an assist force transmitting mechanism. The assist force transmitting mechanism transmits an assist force from an electric motor to the pinion shaft via a worm gear and a worm wheel. The housing includes a rack housing, a pinion housing, and a junction housing. The rack housing accommodates the rack shaft. The pinion housing accommodates the pinion shaft and the assist force transmitting mechanism. The junction housing accommodates a meshing region at which a pinion gear of the pinion shaft and a rack gear of the rack shaft are meshed with each other. An upper portion of the junction housing is covered with the pinion housing. The junction housing has an opening portion that is communicated with the space inside the pinion housing from below.

End portions of the rack shaft respectively protrude from open ends of the rack housing and are connected to tie rods. In order to make the housing water-tight and dust-tight, junctions between the end portions of the rack shaft and the tie rods are respectively covered with boots. An annular oil seal is press-fitted into the opening portion of the junction housing. The oil seal closes an annular clearance between the opening portion and the pinion shaft. With this configuration, even if foreign matter, such as muddy water, enters the rack housing from the open end of the rack housing due to damage to the boot, the oil seal prevents the foreign matter from entering the pinion housing. It is thus possible to protect a speed-reducer, such as the assist force transmitting mechanism, and electric components, such as a motor and an electronic control unit (ECU), disposed in the pinion housing.

In order to assemble the electric power steering system described in JP 10-258749 A, the pinion gear of the pinion shaft is first inserted into the pinion housing, is then passed through the oil seal, and is then meshed with the rack gear in the junction housing. If the pinion gear is covered with a jig, the pinion gear is prevented from causing damage to the oil seal while the pinion gear is passing through the oil seal.

However, in the electric power steering system described in JP 10-258749 A, the oil seal is disposed in the junction housing. Due to this configuration, the pinion gear that has been passed through the oil seal and accommodated in the junction housing is not externally exposed. Therefore, the jig cannot be detached from the pinion gear, and thus the jig cannot be used. As a result, the pinion gear may cause damage to the oil seal while the pinion gear is passing through the oil seal. If a pinion gear having a small diameter is employed in order to prevent the pinion gear from causing damage to the oil seal, it is not necessary to use a jig. However, the diameter of a portion of the pinion shaft that is fitted into the oil seal increases, and thus the weight of the pinion shaft increases.

SUMMARY OF THE INVENTION

One object of the invention is to provide an electric power steering system that can be assembled without allowing a pinion gear to cause damage to a seal member for preventing foreign matter from entering a speed-reducer housing that accommodates a speed-reducer.

An electric power steering system according to an aspect of the invention includes: a rack shaft connected to steered wheels; a rack housing configured to accommodate the rack shaft; a pinion shaft provided with a pinion gear meshed with a rack gear of the rack shaft; a speed-reducer including a worm wheel and a worm shaft, the worm wheel being connected to a portion of the pinion shaft such that the worm wheel is rotatable together with the pinion shaft in an integrated manner, the portion of the pinion shaft protruding from the rack housing; and the worm shaft being meshed with the worm wheel; an electric motor configured to rotationally drive the worm shaft; a speed-reducer housing configured to accommodate the speed-reducer; a bearing disposed in the speed-reducer housing, the bearing being configured to support the pinion shaft such that the pinion shaft is rotatable; and a seal member having an annular shape, the seal member disposed in the speed-reducer housing, at a position closer to the pinion gear than the worm wheel is, and the seal member being configured to seal a clearance between the pinion shaft and the speed-reducer housing.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
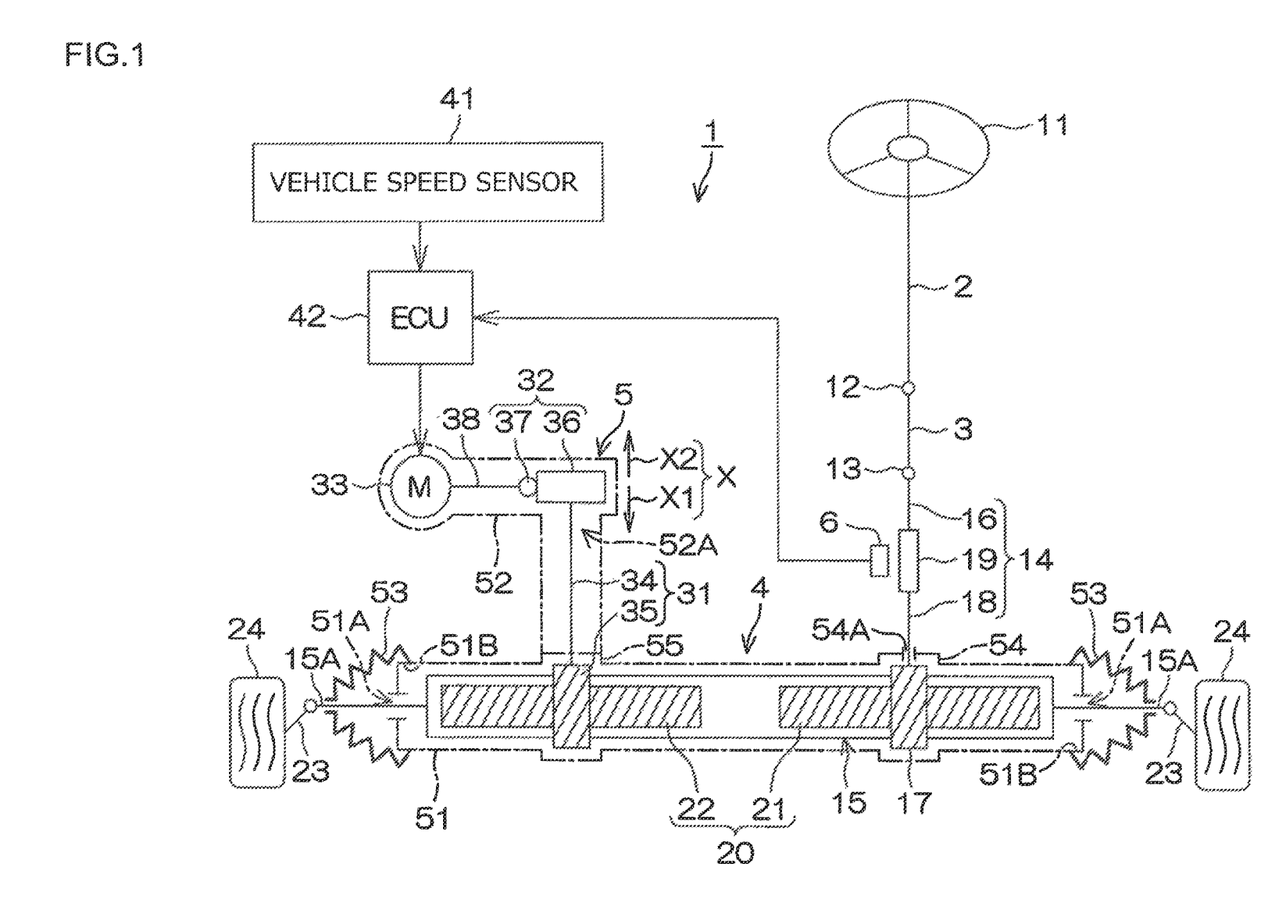
FIG. 1 is a schematic diagram schematically illustrating the configuration of an electric power steering system according to a first embodiment of the invention.

Hereinafter, example embodiments of the invention will be described with reference to the accompanying drawings. FIG. 1 is a schematic diagram schematically illustrating the configuration of an electric power steering system 1 according to a first embodiment of the invention. The electric power steering system 1 includes a steering shaft 2, an intermediate shaft 3, a steering operation mechanism 4, a steering assist mechanism 5, and a torque sensor 6.

The steering shaft 2 extends in the front-rear direction of a vehicle (not illustrated) in which the electric power steering system 1 is mounted. A steering member 11, such as a steering wheel, is connected to a rear end (an upper end in FIG. 1) of the steering shaft 2. A front end (a lower end in FIG. 1) of the steering shaft 2 is connected to one end of the intermediate shaft 3 via a universal joint 12. The other end of the intermediate shaft 3 is connected to the steering operation mechanism 4 via a universal joint 13.

The steering operation mechanism 4 includes a first pinion shaft 14 and a rack shaft 15. The first pinion shaft 14 includes an input shaft 16, an output shaft 18, and a torsion bar 19. The input shaft 16 is connected to the other end of the intermediate shaft 3 via the universal joint 13. The output shaft 18 is provided with a first pinion gear 17. The torsion bar 19 connects the input shaft 16 and the output shaft 18 to each other such that the input shaft 16 and the output shaft 18 are coaxial with each other. As the steering member 11 is steered by a driver, the torsion bar 19 is elastically and torsionally deformed. Thus, the input shaft 16 and the output shaft 18 rotate relative to each other.

The rack shaft 15 extends in the vehicle-width direction of the vehicle (the right-left direction in FIG. 1). A rack gear 20 including a plurality of rack teeth arranged in the axial direction thereof is provided on the surface of the rack shaft 15. The rack gear 20 includes a first rack gear 21 and a second rack gear 22. The first rack gear 21 is disposed in a region on one side in the axial direction (on the right side in FIG. 1), on the surface of the rack shaft 15. The second rack gear 22 is disposed in a region on the other side in the axial direction (on the left side in FIG. 1), on the surface of the rack shaft 15. The first pinion gear 17 is meshed with the first rack gear 21. End portions 15A of the rack shaft 15 in its axial direction are respectively connected to steered wheels 24 via tie rods 23 and knuckle arms (not illustrated). The steering shaft 2 rotates as the steering member 11 is steered. This rotation is converted into a linear motion of the rack shaft 15 in its axial direction by the first rack gear 21 and the first pinion gear 17. As a result, the steered wheels 24 are steered.

The steering assist mechanism 5 is a mechanism configured to assist a driver in steering the steering member 11. The steering assist mechanism 5 includes the rack shaft 15, a second pinion shaft 31, a speed-reducer 32, and an electric motor 33. The second pinion shaft 31 includes a shaft body 34 having a rod shape, and a second pinion gear 35 provided integrally on the shaft body 34. The second pinion shaft 31 is not connected to the steering shaft 2, unlike the first pinion shaft 14. The second pinion gear 35 is meshed with the second rack gear 22 of the rack shaft 15.

The speed-reducer 32 includes a worm wheel 36 having a disc shape, and a worm shaft 37. The worm wheel 36 is connected to the shaft body 34 of the second pinion shaft 31. An outer peripheral surface of the worm wheel 36 has a plurality of tooth grooves (not illustrated) meshed with the worm shaft 37. The tooth grooves are provided at equal intervals in the circumferential direction of the worm wheel 36. The worm shaft 37 is connected to an output shaft 38 of the electric motor 33.

The torque sensor 6 is configured to detect a steering torque at the time when a driver steers the steering member 11. Known sensors may be employed as the torque sensor 6. The torque sensor 6 is disposed around the first pinion shaft 14. The torque sensor 6 is configured to detect a steering torque based on an amount of relative rotation between the input shaft 16 and the output shaft 18. The relative rotation is caused in response to the steering of the steering member 11.

In association with the steering assist mechanism 5 and the torque sensor 6, a vehicle speed sensor 41 configured to detect a vehicle speed and an electronic control unit (ECU) 42 are provided. The vehicle speed sensor 41 and the ECU 42 may be part of the electric power steering system 1, or may be devices that are not included in the electric power steering system 1. The ECU 42 calculates a required steering assist force based on the steering torque detected by the torque sensor 6 and the vehicle speed detected by the vehicle speed sensor 41, and controls driving of the electric motor 33 such that the required steering assist force is generated. Thus, a driving force generated by the electric motor 33 is transmitted to the worm shaft 37. As a result, the worm shaft 37 is rotationally driven, and the worm wheel 36 meshed with the worm shaft 37 rotates at a rotation speed lower than that of the worm shaft 37, along with the rotation of the second pinion shaft 31. The rotation of the second pinion shaft 31 is converted into a linear motion in the axial direction of the rack shaft 15 by the second rack gear 22 and the second pinion gear 35. Thus, steering of the steered wheels 24, that is, steering of the steering member 11, is assisted.

The electric power steering system 1 includes a rack housing 51 configured to accommodate the rack shaft 15 and a speed-reducer housing 52 configured to accommodate the speed-reducer 32. The rack housing 51 is fixed to a vehicle body of the vehicle (not illustrated), and has a tubular shape extending in the vehicle-width direction. An opening portion 51A is provided in each end surface of the rack housing 51 in the vehicle-width direction, that is, in the axial direction of the rack shaft 15. Each end portion 15A of the rack shaft 15 protrudes outward from the rack housing 51 via the corresponding one of the opening portions 51A. A peripheral portion 51B of each opening portion 51A of the rack housing 51 and the corresponding end portion 15A are collectively covered with a boot 53 having a bellows shape and made of rubber or the like. With this configuration, each opening portion 51A is shielded from the outside.

A first pinion housing 54 and a tubular second pinion housing 55, each having a tubular shape and extending so as to cross the vehicle-width direction, are provided integrally with the rack housing 51. The first pinion gear 17 and a part of the output shaft 18 of the first pinion shaft 14 are accommodated in the first pinion housing 54. An annular seal member (not illustrated), such as an oil seal, is disposed in a clearance between the first pinion housing 54 and the output shaft 18 (in a clearance in the radial direction) in an insertion hole 54A in the first pinion housing 54, through which the output shaft 18 is inserted. With this configuration, foreign matter, such as water or dust, is prevented from entering the rack housing 51 through the clearance.

Figure 2:
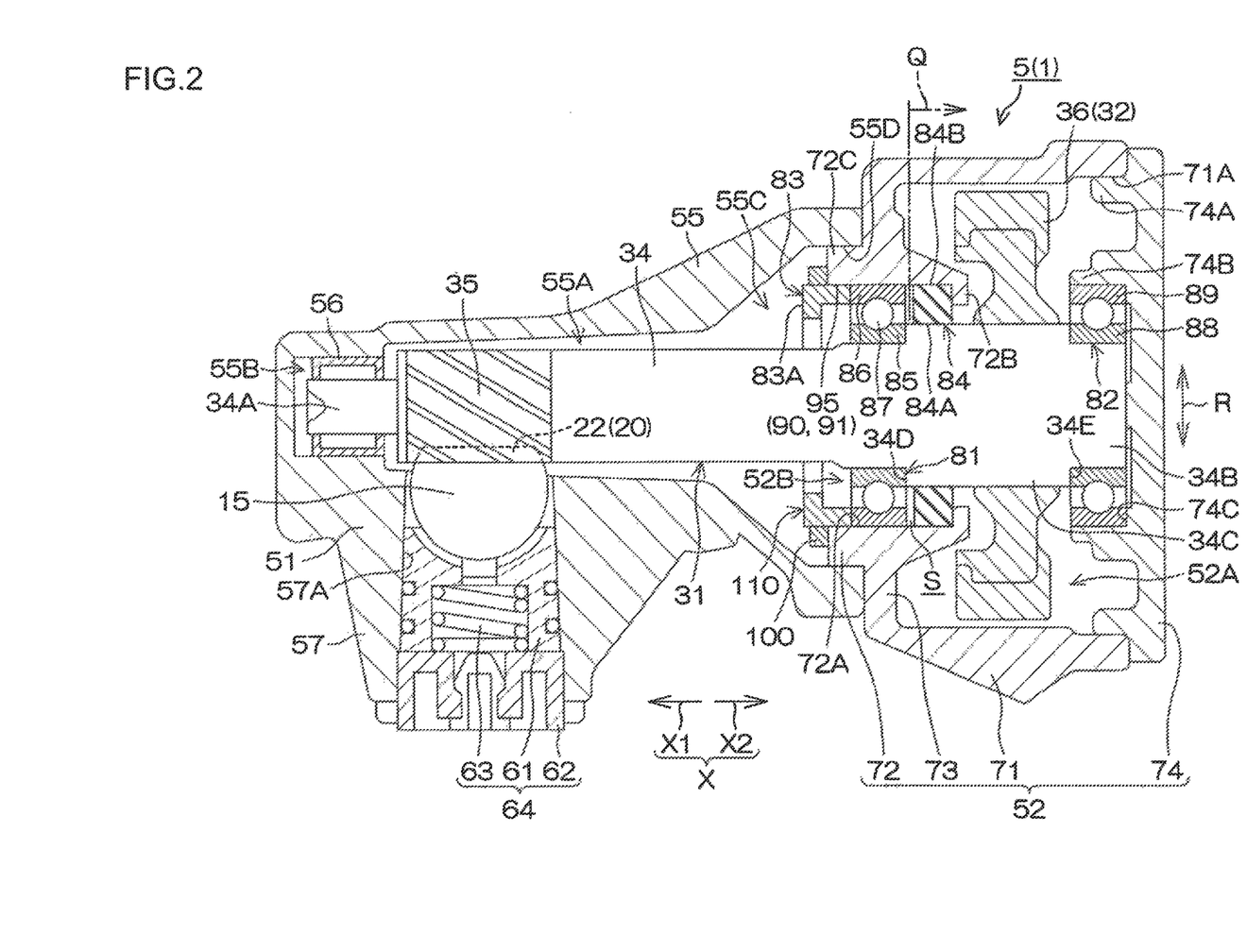
FIG. 2 is a sectional view of a steering assist mechanism in the electric power steering system according to the first embodiment.

FIG. 2 is a sectional view of the steering assist mechanism 5. In the following description, the direction in which the second pinion shaft 31 of the steering assist mechanism 5 extends (the right left direction in FIG. 2) will be referred to as "axial direction X". The radial direction centered on the second pinion shaft 31 will be referred to as "radial direction R.". One side X1 in the axial direction X is the left side in FIG. 2. The other side X2 in the axial direction X is the right side in FIG. 2. The second pinion gear 35 and a part of the shaft body 34, which is on the second pinion gear 35-side, are accommodated in the second pinion housing 55. The second pinion gear 35 is provided in a region on the one side X1, in the shaft body 34 of the second pinion shaft 31.

An internal space 55A in the second pinion housing 55, in which the second pinion gear 35 and a part of the shaft body 34 are disposed, has a cylindrical shape extending in the axial direction X. A bearing 56, having an annular shape and being, for example, a sliding bearing, is fitted in an end portion 55B of the internal space 55A, which is on the one side X1. An end portion 34A of the shaft body 34, which is on the one side X1, is located on the one side X1 with respect to the second pinion gear 35 (i.e., the end portion 34A is located at a position closer to the one side X1-end of the second pinion housing 55 than the second pinion gear 35 is), and has a smaller diameter than that of the other portion of the shaft body 34. The end portion 34A is rotatably supported and surrounded by the bearing 56. An end portion 55C of the internal space 55A, which is on the other side X2, increases in diameter in a tapered shape toward the other side X2 and then extends to the other side X2 with a constant diameter. An insertion hole 55D, at which the end portion 55C of the internal space 55A is exposed to the other side X2, is provided in an end surface of the second pinion housing 55, which is on the other side X2.

A bulging portion 57 is provided integrally with the vicinity of each of the first pinion housing 54 and the second pinion housing 55 of the rack housing 51. The bulging portion 57 provided in the vicinity of the second pinion housing 55 is located on the opposite side of the rack shaft 15 from the second pinion gear 35, and bulges in a direction away from the second pinion gear 35. The bulging portion 57A has a through-hole 57A having a circular shape, extending from the end surface of the bulging portion 57A, which is on the opposite side of the rack shaft 15 from the second pinion gear 35, and communicated with the internal space 55A of the second pinion housing 55. A pressing member 61 having a cylindrical shape, a plug 62 having a disc shape, and an urging member 63 are disposed in the through-hole 57A. The plug 62 closes the through-hole 57A from the opposite side of the rack shaft 15 from the second pinion gear 35. The urging member 63 is, for example, a coil spring.

The pressing member is in contact with a region of the outer peripheral surface of the rack shaft 15, which is on the opposite side of the rack shaft 15 from the rack gear 20. The plug 62 is screwed to the inner peripheral surface of the bulging portion 57 in the through-hole 57A. The urging member 63 is compressed between the pressing member 61 and the plug 62, thereby urging the pressing member 61 toward the rack shaft 15. Thus, the pressing member 61 presses the rack shaft 15 toward the second pinion gear 35. As a result, an appropriate state of meshing between the second rack gear 22 of the rack shaft 15 and the second pinion gear 35 is maintained. In this way, a meshing adjustment mechanism 64 including the pressing member 61, the plug 62, and the urging member 63 may be disposed in the bulging portion 57 disposed in the vicinity of the first pinion housing 54 (see FIG. 1).

The speed-reducer housing 52 has a cylindrical shape as a whole, and includes an outer tubular portion 71, an inner tubular portion 72, a connecting portion 73, and a closing portion 74. Each of the outer tubular portion 71 and the inner tubular portion 72 has a cylindrical shape having a thickness direction that coincides with the radial direction R. The inner tubular portion 72 has a smaller diameter than that of the outer tubular portion 71, and is surrounded by the outer tubular portion 71. The connecting portion 73 has an annular shape having a thickness direction that coincides with the axial direction X. The connecting portion 73 is disposed so as to extend from an end portion of the outer tubular portion 71, which is on the one side X1, to an intermediate portion of the inner tubular portion 72 in the axial direction X. Thus, the connecting portion 73 connects the outer tubular portion 71 and the inner tubular portion 72 to each other. The outer tubular portion 71, the inner tubular portion 72, and the connecting portion 73 are integral and coaxial with each other.

The outer tubular portion 71 has an opening portion 71A having a circular shape and surrounded by an edge of the outer tubular portion 71, which is on the other side X2. A seal member positioning portion 72B protruding inward in the radial direction R is provided integrally with an end portion of the inner peripheral surface 72A of the inner tubular portion 72, which is on the other side X2. The closing portion 74 has a disc shape, and closes the opening portion 71A from the other side X2. The closing portion 74 is attachable to and detachable from the outer tubular portion 71. A first annular projection 74A and a second annular projection 74B are provided integrally with a side surface of the closing portion 74, which is on the one side X1. The first annular projection 74A and the second annular projection 74B have an annular shape, are disposed coaxially with the outer tubular portion 71, the inner tubular portion 72, and the connecting portion 73, and protrude from the closing portion 74 toward the one side X1. The first annular projection 74A has a larger diameter than that of the second annular projection 74B, and is internally fitted the outer tubular portion 71 in the opening portion 71A.

A space that is surrounded by the outer tubular portion 71 from the outside in the radial direction R and that is interposed between both sides in the axial direction X by the connecting portion 73 and the closing portion 74 is an internal space 52A of the speed-reducer housing 52. The worm wheel 36 is accommodated in the internal space 52A. Although not illustrated in the drawing, the worm shaft 37 (see FIG. 1) is also accommodated in the internal space 52A. The electric motor 33 (see FIG. 1) may be accommodated in the internal space 52A. However, the electric motor 33 may be fixed to the outer surface of the speed-reducer housing 52. The ECU 42 (see FIG. 1) may be accommodated in the internal space 52A. A space that is surrounded by the inner peripheral surface 72A of the inner tubular portion 72 from the outside in the radial direction R is an insertion hole 52B having a circular shape, at which the internal space 52A of the speed-reducer housing 52 is exposed to the one side X1. The insertion hole 52B is a part of the internal space 52A.

The speed-reducer housing 52 is connected to the second pinion housing 55 of the rack housing 51 from the other side X2. In this state, an end portion 72C of the inner tubular portion 72 of the speed-reducer housing 52, which is on the one side X1, is inserted through the insertion hole 55D of the second pinion housing 55 from the other side X2. In this state, the insertion hole 52B of the speed-reducer housing 52 faces the inside of the rack housing 51, that is, the internal space 55A of the second pinion housing 55, from the other side X2. The second pinion housing 55 surrounds the end portion 72C from the outside in the radial direction R, and is in contact with the connecting portion 73 of the speed-reducer housing 52 from the one side X1.

The end portion 34B of the shaft body 34 of the second pinion shaft 31, which is on the other side X2, protrudes from the insertion hole 55D of the second pinion housing 55 of the rack housing 51 toward the other side X2. The end portion 34B is inserted through the insertion hole 52B of the speed-reducer housing 52, and is disposed in the internal space 52A. At an intermediate portion of the end portion 34B (the portion protruding from the rack housing 51) in the axial direction X, a large-diameter portion 34C having a larger diameter than that of the other portion of the end portion 34B is provided. The large-diameter portion 34C passes through the central portion of the worm wheel 36 having a disc shape, in the internal space 52A. The large-diameter portion 34C is connected to the worm wheel 36 by press fitting, spline coupling, or the like, such that the large-diameter portion 34C is rotatable together with the worm wheel 36 in an integrated manner.

The steering assist mechanism 5 includes a first bearing 81, a second bearing 82, a plug 83, and a seal member 84. The first bearing 81 is a rolling bearing. The first bearing 81 includes an inner ring 85, an outer ring 86, a plurality of rolling elements (balls) 87, and a cage (not illustrated). The rolling elements 87 are disposed between the outer ring 86 and the inner ring 85. The cage holds the rolling elements 87 at equal intervals. The first bearing 81 is disposed in an intermediate portion of the insertion hole 52B of the speed-reducer housing 52 in the axial direction. Specifically, the inner ring 85 is externally fitted to a portion of the end portion 34B of the shaft body 34 of the second pinion shaft 31, which on the one side X1 with respect to the large-diameter portion 34C (i.e., the portion of the end portion 34B to which the inner ring 85 is externally fitted is located at a position closer to the second pinion gear 35 than the large-diameter portion 34C is). The outer ring 86 is internally fitted to the inner peripheral surface of the speed-reducer housing 52 (that is, the inner peripheral surface 72A of the inner tubular portion 72) in the insertion hole 52B. The inner ring 85 may be press-fitted, to the end portion 34B. The outer ring 86 may be press-fitted to the inner peripheral surface 72A. The first bearing 81 is disposed on the one side X1, that is, on the second pinion gear 35-side, with respect to the worm wheel 36 connected to the large-diameter portion 34C (i.e., the first bearing 81 is disposed at a position closer to the second pinion gear 35 than the worm wheel 36 is).

The second bearing 82 is a rolling bearing having the same configuration as that of the first bearing 81. The second bearing 82 is disposed at a position apart, in a direction toward the other side X2, from the first bearing 81 in the internal space 52A of the speed-reducer housing 52. In the second bearing 82, an inner ring 88 is externally fitted to a portion of the end portion 34B of the shaft body 34 of the second pinion shaft 31, which is on the other side X2 with respect to the large-diameter portion 34C (i.e., the portion of the end portion 34B to which the inner ring 88 is externally fitted is located at a position closer to the other side X2-end of the speed-reducer housing 52 than the large-diameter portion 34C is). An outer ring 89 is internally fitted to the second annular projection 74B of the closing portion 74 of the speed-reducer housing 52. The inner ring 88 comes into contact with the large-diameter portion 34C from the other side X2, and the outer ring 89 comes into contact with the closing portion 74 from the one side X1. Thus, the second bearing 82 is positioned in the axial direction X. The inner ring 88 is not in contact with the closing portion 74. The second pinion shaft 31 is rotatably supported by the first bearing 81 and the second bearing 82 that are located on respective sides of the large-diameter portion 34C in the axial direction X.

The plug 83 has an annular shape. A threaded portion 90 is provided on the outer peripheral surface of the plug 83. A threaded portion 91 is provided at an end portion of the inner peripheral surface 72A of the inner tubular portion 72 of the speed-reducer housing. 52, which is on the one side X1. The plug 83 is fitted into the insertion hole 52B of the speed-reducer housing 52 from the one side X1, in a state where the plug 83 surrounds the shaft body 34 of the second pinion shaft 31 in a non-contact manner. When the threaded portion 90 and the threaded portion 91 are meshed with each other, the plug 83 is screwed to the inner peripheral surface 72A and comes into contact with the outer ring 86 of the first bearing 81 from the one side X1. Because a nut 100 having an annular shape comes into contact with the end portion 72C of the inner tubular portion 72 from the one side X1 and is screwed onto the threaded portion 90 of the plug 83, the plug 83 is strongly fastened. By bringing the plug 83 into contact with the outer ring 86 from the one side X1 and bringing the inner ring 85 into contact with the large-diameter portion 34C from the one side X1, the first bearing 81 is positioned in the axial direction X. By bringing the plug 83 into contact with the outer ring 86 from the one side X1, a preload is applied to the outer ring 86. A protruding portion 83A having an annular shape and protruding inward in the radial direction R is provided integrally with the end portion of the plug 83, which is on the one side X1.

The steering assist mechanism 5 includes a preload applying mechanism 110 that applies a preload to the first bearing 81 and the second bearing 82. The second pinion shaft 31 includes a first inner ring positioning portion 34D and a second inner ring positioning portion 34E that are provided on the outer periphery of the large-diameter portion 34C. The first inner ring positioning portion 34D and the second inner ring positioning portion 34E are a pair of positioning stepped portions facing opposite sides in the axial direction X.

The first inner ring positioning portion 34D comes into contact with the inner ring 85 of the first bearing 81 from the worm wheel 36-side, thereby positioning the inner ring 85 in the axial direction X. The second inner ring positioning portion 34E comes into contact with the inner ring 88 of the second bearing 82 from the worm wheel 36-side, thereby positioning the inner ring 88 in the axial direction X. Thus, movement of each of the inner ring 85 of the first bearing 81 and the inner ring 88 of the second bearing 82 in the axial direction X relative to the second pinion shaft 31 is restricted.

The preload applying mechanism 110 includes an outer ring positioning portion 74C and the plug 83. The outer ring positioning portion 74C is provided in the closing portion 74, and positions the outer ring 89 of the second bearing 82. The plug 83 is an example of an urging member configured to urge the outer ring 86 of the first bearing 81 toward the second bearing 82. The outer ring positioning portion 74C comes into contact with the outer ring 89 of the second bearing 82 from the other side X2. An urging force is applied to the outer ring 86 of the first bearing 81 by fastening of the plug 83. The urging force is applied to the outer ring positioning portion 74C of the closing portion 74 sequentially through the inner ring 85 of the first bearing 81, the first inner ring positioning portion 34D and the second inner ring positioning portion 34E of the second pinion shaft 31, and the inner ring 88 and the outer ring 89 of the second bearing 82. Thus, a preload is applied to the first bearing 81 and the second bearing 82 and a bearing clearance of each of the first bearing 81 and the second bearing 82 is removed.

The seal member 84 is an oil seal having an annular shape and made of, for example, rubber or resin. A section of the seal member 84 at any position on its circumference has a generally rectangular shape. The seal member 84 is disposed in the internal space 52A of the speed-reducer housing 52. Specifically, the seal member 84 is disposed at a position on the other side X2 with respect to the first bearing 81 (i.e., the seal member 84 is disposed at a position closer to the other side X2-end of the speed-reducer housing 52 than the first bearing 81 is), in the insertion hole 52B defined by the inner peripheral surface 72A of the inner tubular portion 72 of the speed-reducer housing 52. The seal member 84 is externally fitted to an end portion of the large-diameter portion 34C of the shaft body 34 of the second pinion shaft 31, which is on the one side X1. Thus, the seal member 84 is disposed on the one side X1 with respect to the worm wheel 36 connected to the large-diameter portion 34C (i.e., the seal member 84 is disposed at a position closer to the one side X1-end of the second pinion housing 55 than the worm wheel 36 is). Specifically, the seal member 84 is disposed between the worm wheel 36 and the first bearing 81 in the axial direction X.

The seal member 84 is positioned in the axial direction X, by coming into contact with the seal member positioning portion 72B provided at the end portion of the large-diameter portion 72, which is on the other side X2, from the one side X1. In other words, the seal member positioning portion 72B comes into contact with the seal member 84 from the worm wheel 36-side, thereby positioning the seal member 84. An axial clearance S is interposed between the seal member 84 and the first bearing 81.

An inner peripheral surface 84A of the seal member 84 is in close contact with the large-diameter portion 34C over the whole region in its circumferential direction. An outer peripheral surface 84B of the seal member 84 is in close contact with the inner peripheral surface 72A of the inner tubular portion 72 over the whole region in its circumferential direction. Thus, the seal member 84 seals a clearance in the radial direction R, between the large-diameter portion 34C of the shaft body 34 of the second pinion shaft 31 and the inner peripheral surface 72A of the inner tubular portion 72 of the speed-reducer housing 52. While the second pinion shaft 31 rotates, the large-diameter portion 34C slides on the inner peripheral surface 84A of the seal member 84.

In the electric power steering system 1, foreign matter may enter the rack housing 51, for example, due to damage to the boot 53 (see FIG. 1). When the foreign matter is water, the rack housing 51 is filled with water and the water reaches the internal space 52A through the insertion hole 52B of the speed-reducer housing 52. As a result, the speed-reducer 32 in the internal space 52A may rust or electric components, such as the electric motor 33 and the ECU 42, may have an electrical failure. However, in the electric power steering system 1, the seal member 84 seals the clearance between the speed-reducer housing 52 and the second pinion shaft 31. With this configuration, when foreign matter enters the rack housing 51, the seal member 84 can prevent the foreign matter from entering the speed-reducer housing 52 from the second pinion housing 55 of the rack housing 51. A waterproof region Q in the speed-reducer housing 52 in a case where the foreign matter is water is a region on the other side X2 with respect to the first bearing 81 (i.e., a region that is located at a position closer to the other side X2-end of the speed-reducer housing 52 than the first bearing 81 is).

Figure 3:
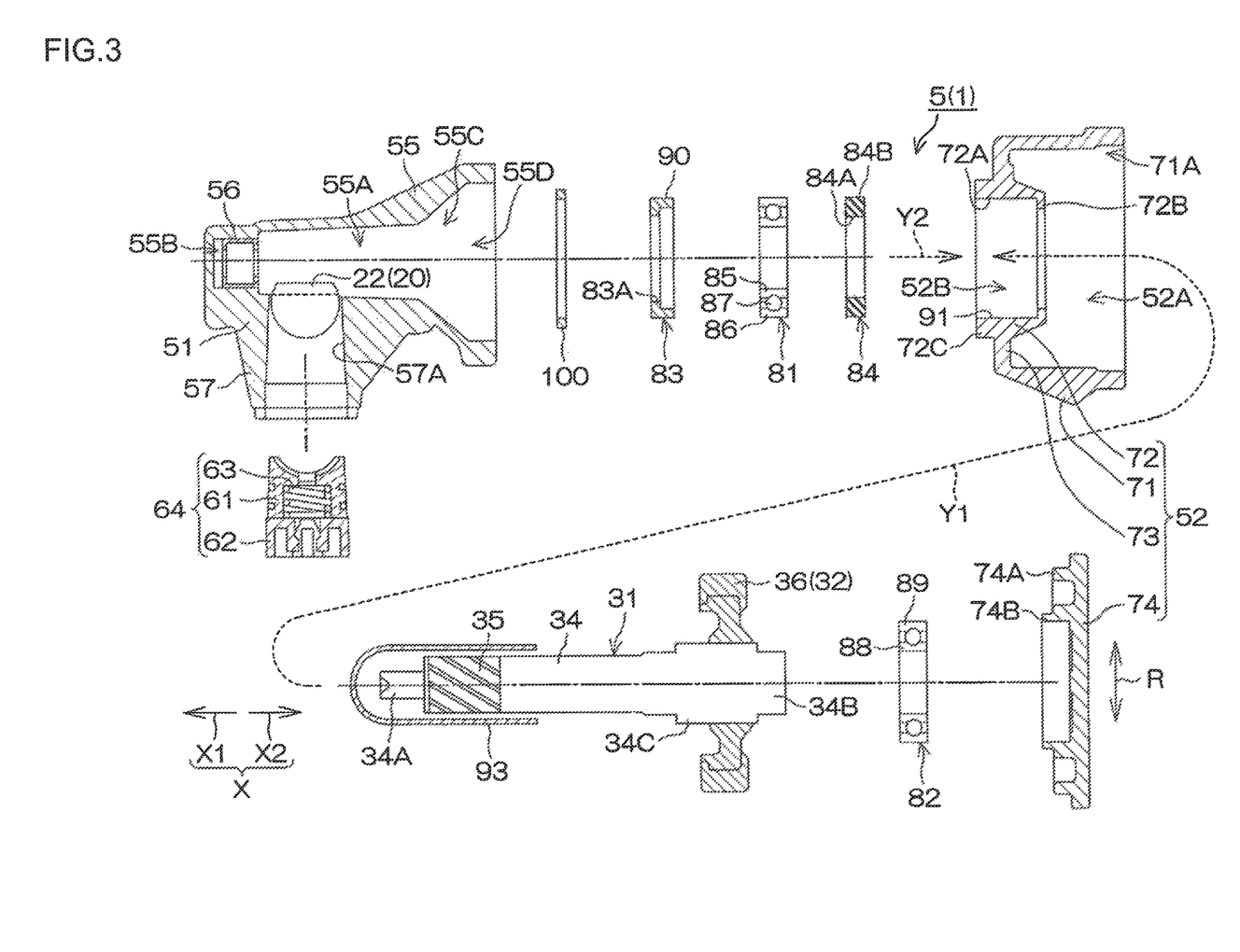
FIG. 3 is a diagram corresponding to the sectional view illustrated in FIG. 2, FIG. 3 being an exploded diagram of the steering assist mechanism.

The seal member 84 is disposed in the speed-reducer housing 52. As illustrated in FIG. 3, a jig 93 having a cap shape and configured to cover the second pinion gear 35 can be used to prevent damage to the seal member 84 when the electric power steering system 1 is assembled. Specifically, first, a worker assembles the rack gear 20 and the bearing 56 into the second pinion housing 55, and connects the worm wheel 36 to the second pinion shaft 31. Then, the worker inserts the second pinion gear 35 of the second pinion shaft 31, which is covered with the jig 93, into the speed-reducer housing 52 from the other side X2 as indicated by an arrow Y1 and then causes the second pinion gear 35 covered with the jig 93, to be exposed to the one side X1 from the insertion hole 52B. Then, the worker passes the second pinion gear 35 covered with the jig 93 through the seal member 84, by externally fitting the seal member 84 to the second pinion gear 35 from the one side X1 as indicated by an arrow Y2. Then, the worker detaches the jig 93 from the second pinion gear 35. Then, the worker assembles the first bearing 81 and the second bearing 82 to the second pinion shaft 31, assembles the plug 83 into the insertion hole 52B, and then assembles the nut 100 to the plug 83. Then, the worker inserts the second pinion gear 35 into the rack housing 51 to cause the second pinion gear 35 to be meshed with the rack gear 20, couples the rack housing 51 and the speed-reducer housing 52 to each other, attaches the closing portion 74 to the outer tubular portion 71 of the speed-reducer housing 52, and finally assembles the meshing adjustment mechanism 64 to the rack housing whereby the electric power steering system 1 can be assembled. In this way, by using the jig 93, it is possible to assemble the electric power steering system 1 without causing damage to the seal member 84 due to the second pinion gear 35. The worker may insert the second pinion gear 35 covered with the jig 93 into the speed-reducer housing 52 in which the seal member 84 has already been assembled into the insertion hole 52B to pass the second pinion gear 35 through the seal member 84, cause the second pinion gear 35 covered with the jig 93, to be exposed to the one side X1 from the insertion hole 52B, and then detach the jig 93 from the second pinion gear 35.

In the speed-reducer housing 52 of the completed electric power steering system 1, the first bearing 81 is disposed closer to the second pinion gear 35 than the worm wheel 36 is, and the seal member 84 is disposed between the worm wheel 36 and the first bearing 81 (see FIG. 2). In this case, when the electric power steering system 1 is assembled, the worker can assemble the first bearing 81 to the second pinion shaft 31 of which the second pinion gear 35 has passed through the seal member 84, from the second pinion gear 35-side (the one side X1) as indicated by the arrow Y2.

Figure 4:
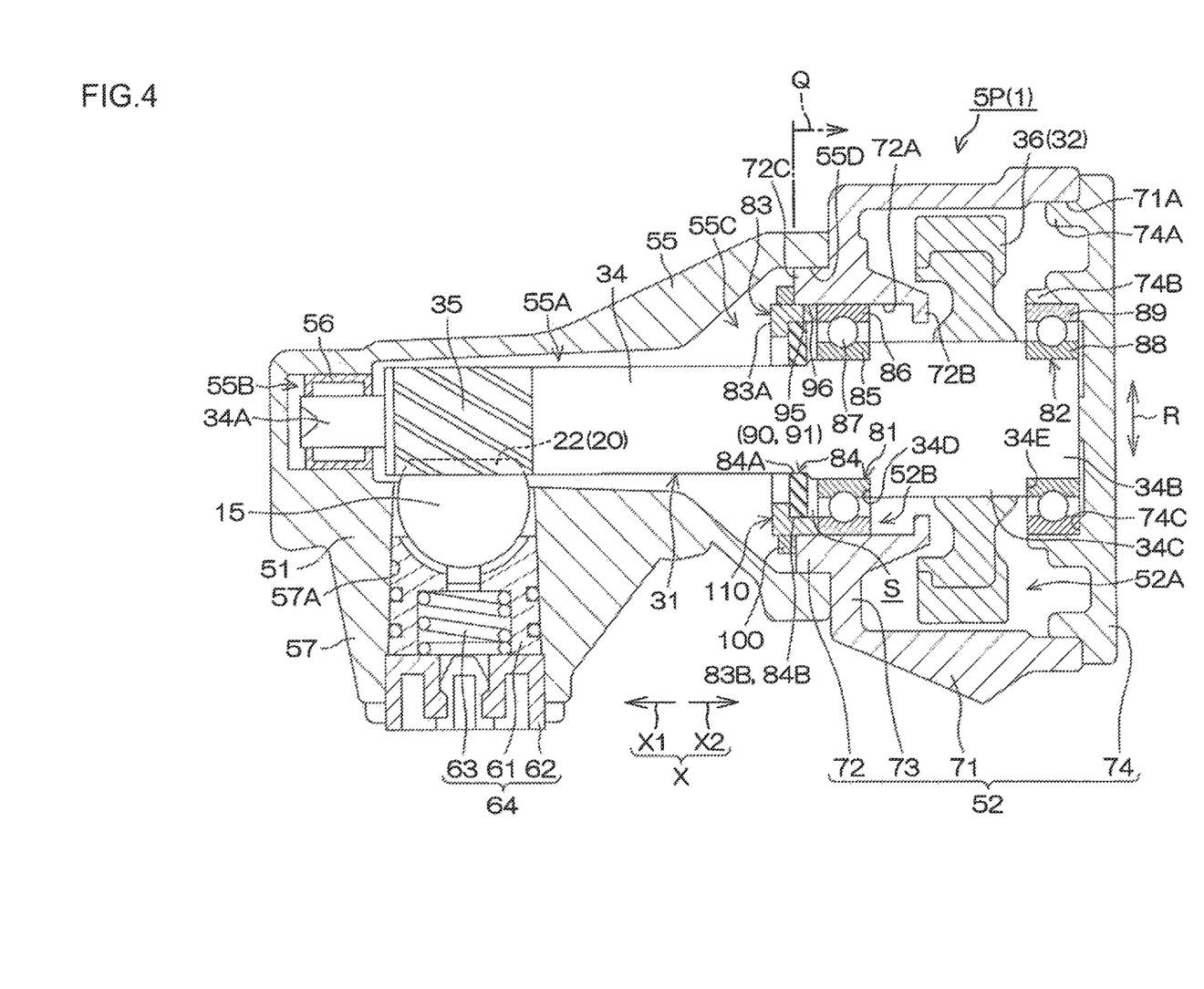
FIG. 4 is a sectional view of a steering assist mechanism according to a second embodiment of the invention.

The axial clearance S is provided between the first bearing 81 that is urged from the second pinion gear 35-side by the plug 83 (an example of an urging member) and the seal member 84 that is positioned in the axial direction X by the seal member positioning portion 72B of the speed-reducer housing 52. Thus, even when the first bearing 81 is displaced in the axial direction X (toward the second bearing 82) by the plug 83 to apply a preload to the first bearing 81 and the second bearing 82, the seal member 84 does not receive a compression force in the axial direction X, thereby improving durability of the seal member 84. FIG. 4 is a sectional view of a steering assist mechanism 5P according to a second embodiment of the invention. In FIG. 4, the same elements as those described above will be denoted by the same reference symbols as those in the foregoing description and detailed description thereof will be omitted. In the first embodiment, the seal member 84 is externally fitted to the shaft body 34 of the second pinion shaft 31, at a position between the worm wheel 36 and the first bearing 81 (see FIG. 2). However, in the second embodiment, the seal member 84 is externally fitted to the shaft body 34, at a position on the one side X1 with respect to the first bearing 81 (i.e., at a position closer to the one side X1-end of the second pinion housing 55 than the first bearing 81 is), and is press-fitted to the plug 83. Specifically, the seal member 84 is disposed between the protruding portion 83A of the plug 83 and the first bearing 81 in the axial direction X, and is internally fitted to a portion of the plug 83, which is on the other side X2 with respect to the protruding portion 83A (i.e., the portion of the plug 83 to which the seal member 84 is internally fitted is located at a position closer to the other side X2-end of the speed-reducer housing 52 than the protruding portion 83A is).

The protruding portion 83A of the plug 83 serves as a seal member positioning portion configured to conic into contact with the seal member 84 from the opposite side of the seal member 84 from the worm wheel 36, thereby positioning the seal member 84 in the axial direction X. An axial clearance S is provided between the seal member 84 and the first bearing 81. With this configuration, the seal member 84 does not receive a force in the axial direction X between the protruding portion 83A and the first bearing 81. In the second embodiment illustrated in FIG. 4, the seal member positioning portion 72B having the same configuration as that in the first embodiment illustrated in FIG. 2 may be omitted.

In the second embodiment, the inner peripheral surface 84A of the seal member 84 is in close contact with the shaft body 34 over the whole region in its circumferential direction. The outer peripheral surface 84B of the seal member 84 is in close contact with the inner peripheral surface 8313 of the plug 83 over the whole region in its circumferential direction. Thus, the seal member 84 seals a clearance in the radial direction R, between the shaft body 34 of the second pinion shaft 31 and the inner peripheral surface 8313 of the plug 83, in the speed-reducer housing 52. As a result, in the second embodiment as well, it is possible to prevent foreign matter from entering the speed-reducer housing 52 from the rack housing 51. Particularly, the waterproof region Q in the speed-reducer housing 52 of the steering assist mechanism 5P according to the second embodiment starts from a position on the one side X1 with respect to the first bearing 81 (i.e., from a position located closer to the one side X1-end of the second pinion housing 55 than the first bearing 81 is). Thus, the waterproof region Q in the second embodiment is larger in the axial direction X than the waterproof region Q (see FIG. 2) in the steering assist mechanism 5 according to the first embodiment. Thus, the first bearing 81 can also be protected from water.

In the second embodiment as well, the seal member 84 is disposed in the speed-reducer housing 52. Thus, when the electric power steering system 1 is assembled, the jig 93 (see FIG. 3) that covers the second pinion gear 35 can be used so as not to cause damage to the seal member 84. When the electric power steering system 1 according to the second embodiment is assembled, a worker assembles the plug 83 to which the seal member 84 has been press-fitted and the first bearing 81, into the insertion hole 52B of the speed-reducer housing 52 in advance. Then, the second pinion gear 35 covered with the jig 93 is passed through the seal member 84, and then the jig 93 is detached from the second pinion gear 35 (see FIG. 3). Alternatively, the worker causes the second pinion gear 35 to be exposed to the one side X1 from the insertion hole 52B of the speed-reducer housing 52. The worker assembles the plug 83 to which the seal member 84 has been press-fitted and the first bearing 81 into the insertion hole 52B while externally fitting the plug 83 and the first bearing 81 to the second pinion gear 35 covered with the jig 93, and then detaches the jig 93 from the second pinion gear 35.

Figure 5:
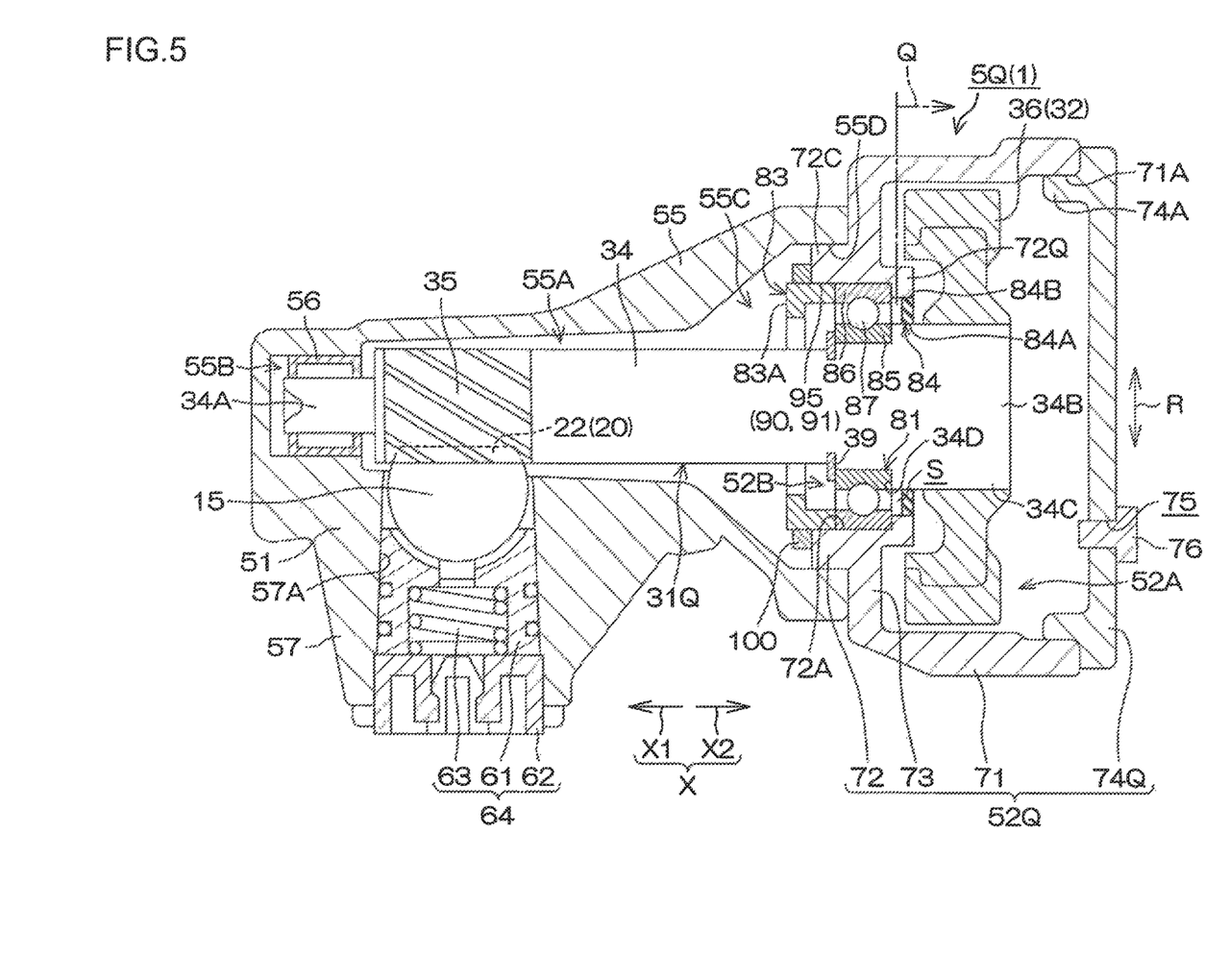
FIG. 5 is a sectional view of a steering assist mechanism according to a third embodiment of the invention.

In the second embodiment, the screwed portion 95 at which the speed-reducer housing 52 and the plug 83 are screwed to each other, in the insertion hole 52B, that is, a clearance between the threaded portion 90 on the outer peripheral surface of the plug 83 and the threaded portion 91 on the inner peripheral surface 72A of the inner tubular portion 72 of the speed-reducer housing 52, is provided with a liquid gasket 96 by coating or the like. Thus, it is possible to reliably prevent foreign matter from entering the speed-reducer housing 52 from the rack housing 51. In the steering assist mechanism 5 according to the first embodiment illustrated in FIG. 2, it is not necessary to provide the liquid gasket 96 at the screwed portion 95, and it is thus possible to promote cost reduction. FIG. 5 is a sectional view of a steering assist mechanism 5Q according to a third embodiment of the invention. In FIG. 5, the same elements as those described above will be denoted by the same reference symbols as those in the foregoing description and detailed description thereof will be omitted. The steering assist mechanism 5Q according to the third embodiment illustrated in FIG. 5 is different from the steering assist mechanism 5 according to the first embodiment illustrated in FIG. 2, mainly in the following configuration.

A speed-reducer housing 52Q according to the third embodiment includes a closing portion 74Q instead of the closing portion 74 of the speed-reducer housing 52 according to the first embodiment. A second pinion shaft 31Q according to the third embodiment is not supported by the closing portion 74Q. That is, the first bearing 81 is a single bearing that supports the second pinion shaft 31Q in the speed-reducer housing 52Q. That is, a bearing (corresponding to the second bearing 82 according to the first embodiment illustrated in FIG. 2) that supports the second pinion shaft 31Q is not disposed on the opposite side of the worm wheel 36 from the first bearing 81 in the speed-reducer housing 52Q. Thus, it is not necessary to provide a structure for fitting the bearing (corresponding to the second bearing 82 in the first embodiment illustrated in FIG. 2) in the closing portion 74Q of the speed-reducer housing 52Q and the second pinion shaft 31Q. It is therefore possible to simplify the structure.

In the third embodiment, a protruding portion of the second pinion shaft 31Q, which protrudes from the worm wheel 36 toward the closing portion 74Q, may be omitted or an amount of protrusion of the protruding portion may be reduced, whereby size reduction can be achieved. In the third embodiment, a through-hole 75 that opens the internal space 52A of the speed-reducer housing 52Q into an external space is provided in the closing portion 74Q. A breather 76 is attached to the through-hole 75. Although not illustrated in the drawing, the breather 76 is provided with an air passage having a labyrinth structure. Between the internal space 52A and the external space, the breather 76 permits the flow of air via the air passage and prohibits the flow of water content. The internal space 52A is prevented from having a negative pressure, by an operation of the breather 76. That is, generation of a negative pressure for permitting foreign matter (for example, water content) to enter the internal space 52A from the external space is prevented by the operation of the breather 76. The breather 76 may be disposed in the closing portion 74 in each of the first embodiment illustrated in FIG. 2 and the second embodiment illustrated in FIG. 4.

In the third embodiment, a positioning member 39, such as a snap ring, is engaged with a circumferential groove provided in the outer periphery of the second pinion shaft 31Q. The positioning member 39 comes into contact with the inner ring 85 of the first hearing 81 from the second pinion gear 35-side. Thus, the inner ring 85 is interposed in the axial direction X between the first inner ring positioning portion 34D of the second pinion shaft 31Q and the positioning member 39. As a result, movement of the inner ring 85 relative to the second pinion shaft 31Q in the axial direction is restricted.

On the other hand, an outer ring positioning portion 72Q provided in the speed-reducer housing 52Q comes into contact with the outer ring 86 of the first bearing 81 from the worm wheel 36-side. The plug 83 comes into contact with the outer ring 86 of the first bearing 81 from the second pinion gear 35-side. The plug 83 serves as a positioning member configured to press the outer ring 86 to the outer ring positioning portion 72Q, thereby positioning the outer ring 86. Thus, movement of the second pinion shaft 31Q in the axial direction is restricted via the first bearing 81.

The seal member 84 is disposed in a clearance between the inner peripheral surface of the outer ring positioning portion 72Q and the outer peripheral surface of the large-diameter portion 34C of the second pinion shaft 31Q, and is configured to seal the clearance. The outer peripheral surface 84B of the seal member 84 is press-fitted and fixed to the inner peripheral surface of the outer ring positioning portion 72Q. The inner peripheral surface 84A of the seal member 84 comes into sliding contact with the outer peripheral surface of the large-diameter portion 34C of the second pinion shaft 31Q.

The seal member 84 may include a reinforcement metal core and a rubber member molded on the metal core. In this case, an annular seal lip surrounding the second pinion shaft 31Q may be provided on the inner peripheral surface of the seal member 84. In the third embodiment as well, it is possible to prevent foreign matter from entering the speed-reducer housing 52Q from the rack housing 51. In the third embodiment, the electric power steering system 1 is assembled in the same assembling sequence as that in the first embodiment, except that it is not necessary to assemble the second bearing 82 and the positioning member 39 is engaged with the circumferential groove of the second pinion shaft 31Q to position the first bearing 81 in the axial direction of the second pinion shaft 31Q after the first bearing 81 is assembled to the second pinion shaft 31Q. That is, in the third embodiment as well, the jig (see FIG. 3) that covers the second pinion gear 35 so as not to cause damage to the seal member 84 can be used when the electric power steering system 1 is assembled.

Figure 6:
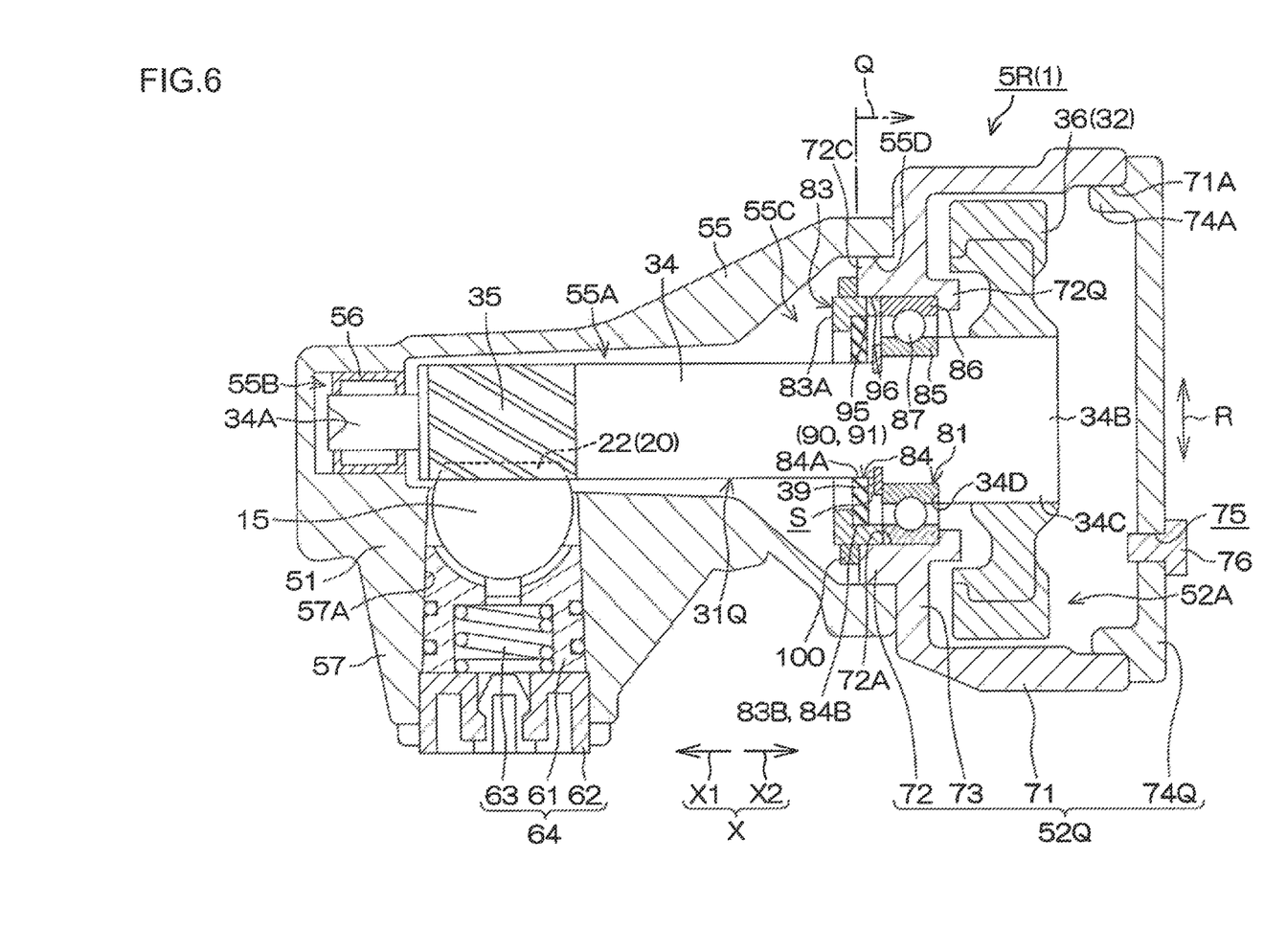
FIG. 6 is a sectional view of a steering assist mechanism according to a fourth embodiment of the invention.

Because the second pinion shaft 31Q is supported by the first bearing 81, which is a single bearing supporting the second pinion shaft 31Q in the speed-reducer housing 52Q, it is possible to simplify the structure. Because the seal member 84 is disposed in the clearance between the outer ring positioning portion 72Q and the second pinion shaft 31Q (the clearance in the radial direction), it is possible to achieve size reduction in the axial direction X. FIG. 6 is a sectional view of a steering assist mechanism 5R according to a fourth embodiment of the invention. In FIG. 6, the same elements as those described above will be denoted by the same reference symbols as those in the foregoing description, and detailed description thereof will be omitted. In the steering assist mechanism 5R according to the fourth embodiment illustrated in FIG. 6, the same configuration as that in the steering assist mechanism 5Q according to the third embodiment illustrated in FIG. 5 is employed for supporting of the second pinion shaft, and the same configuration as that in the steering assist mechanism 5P according to the second embodiment illustrated in FIG. 4 is employed for disposing of the seal member 84.

In the fourth embodiment as well as in the third embodiment illustrated in FIG. 5, the first bearing 81 is a single bearing that supports the second pinion shaft 31Q in the speed-reducer housing 52Q. In the fourth embodiment as well as in the second embodiment illustrated in FIG. 4, the seal member 84 is externally fitted to the second pinion shaft 31Q and is press-fitted to the plug 83. The seal member 84 comes into contact with the protruding portion 83A of the plug 83 (a seal member positioning portion), and is positioned in the axial direction X. An axial clearance S is provided between the seal member 84 and the first bearing 81.

In the fourth embodiment as well, it is possible to prevent foreign matter from entering the speed-reducer housing 52Q from the rack housing 51. In the fourth embodiment, the electric power steering system 1 is assembled in the same assembling sequence as that in the second embodiment, except that it is not necessary to assemble the second bearing 82 and the positioning member 39 is engaged with the circumferential groove of the second pinion shaft 31Q to position the first bearing 81 in the axial direction of the second pinion shaft 31Q after the first bearing 81 is assembled to the second pinion shaft 31Q. That is, in the fourth embodiment as well, the jig (see FIG. 3) that covers the second pinion gear 35 so as not to cause damage to the seal member 84 can be used when the electric power steering system 1 is assembled.

Because the second pinion shaft 31Q is supported by the single bearing (the first bearing 81) that is disposed in the speed-reducer housing 52Q, it is possible to simplify the structure. In the fourth embodiment, the waterproof region Q is larger in the axial direction X than that in the third embodiment. The invention is not limited to the above-described embodiments, and various modifications may be made within the scope described in the appended claims.

Figure 7:
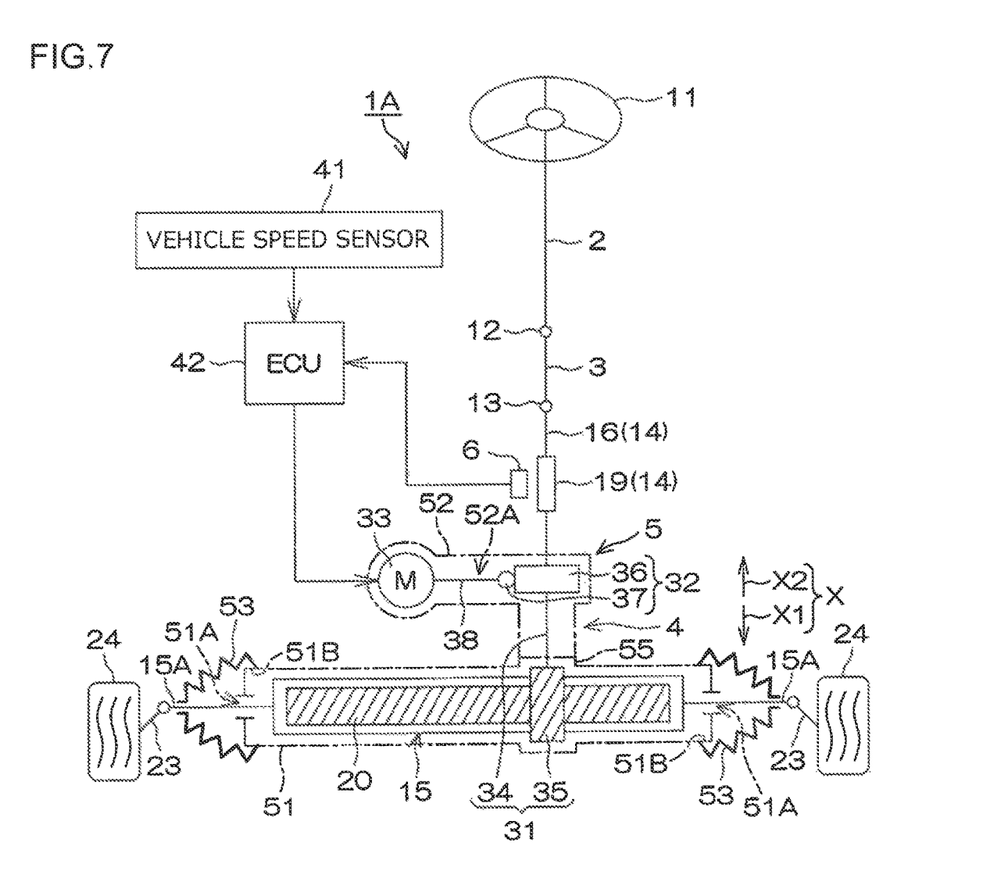
FIG. 7 is a schematic diagram schematically illustrating the configuration of an electric power steering system according to a fifth embodiment of the invention.

For example, the electric power steering system 1 (see FIG. 1) is a dual pinion-type electric power steering (DP-EPS) including the first pinion shaft 14 and the second pinion shaft 31. However, the invention may be applied to a pinion-type EPS (P-EPS). An electric power steering system 1A according to a fifth embodiment, which is a pinion-type EPS, is illustrated in FIG. 7. In FIG. 7, the same elements as those described above will be denoted by the same reference symbols as those in the foregoing description and detailed description thereof will be omitted. In the electric power steering system 1A, the first pinion gear 17 and the output shaft 18 of the first pinion shaft 14 and the first pinion housing 54 (see FIG. 1) are omitted. The torsion bar 19 of the first pinion shaft 14 is connected to the shaft body 34 of the second pinion shaft 31. The configuration in the second pinion housing 55 of the electric power steering system 1A is the same as the configuration in the second pinion housing 55 of the electric power steering system 1 according to any one of the first to fourth embodiments (see FIGS. 2, 4, 5, and 6).

What is claimed is:

1. An electric power steering system comprising:
   a rack shaft connected to steered wheels;
   a rack housing configured to accommodate the rack shaft;
   a pinion shaft provided with a pinion gear meshed with a rack gear of the rack shaft;
   a speed-reducer including a worm wheel and a worm shaft, the worm wheel being connected to a portion of the pinion shaft such that the worm wheel is rotatable together with the pinion shaft in an integrated manner, the portion of the pinion shaft protruding from the rack housing, and the worm shaft being meshed with the worm wheel;
   an electric motor configured to rotationally drive the worm shaft;

a speed-reducer housing configured to accommodate the speed-reducer;
a bearing disposed in the speed-reducer housing, the bearing being configured to support the pinion shaft such that the pinion shaft is rotatable; and
a seal member having an annular shape, the seal member disposed in the speed-reducer housing between the worm wheel and the pinion gear, and the seal member being configured to seal a clearance between the pinion shaft and the speed-reducer housing.

2. The electric power steering system according to claim 1, wherein:
the bearing is disposed between the worm wheel and the pinion gear; and
the seal member is disposed between the worm wheel and the bearing.

3. The electric power steering system according to claim 2, wherein:
the bearing is a single bearing supporting the pinion shaft in the speed-reducer housing;
the bearing includes an outer ring and an inner ring, the outer ring being internally fitted to the speed-reducer housing, and the inner ring being externally fitted to the pinion shaft in a state where the inner ring is positioned in an axial direction;
the speed-reducer housing includes an outer ring positioning portion having an annular shape, the outer ring positioning portion configured to come into contact with the outer ring from a worm wheel-side; and
the seal member is disposed in a clearance between the pinion shaft and the outer ring positioning portion of the speed-reducer housing, the seal member being configured to seal the clearance.

4. The electric power steering system according to claim 2, wherein
a first bearing serving as the bearing is disposed between the worm wheel and the pinion gear,
the electric power steering system further comprises:
a second bearing disposed on an opposite side of the worm wheel from the first bearing; and
a preload applying mechanism configured to apply a preload to the first bearing and the second bearing,
each of the first bearing and the second bearing includes an outer ring and an inner ring, the outer ring being internally fitted to the speed-reducer housing, and the inner ring being externally fitted to the pinion shaft in a state where movement of the inner ring relative to the pinion shaft in an axial direction is restricted,
the preload applying mechanism includes an outer ring positioning portion and an urging member, the outer ring positioning portion being provided in the speed-reducer housing, the outer ring positioning portion being configured to come into contact with the outer ring of the second bearing from an opposite side of the second bearing from the worm wheel, the urging member being held by the speed-reducer housing, and the urging member being configured to come into urging contact with the outer ring of the first bearing from the pinion gear-side,
the seal member is disposed between the worm wheel and the first bearing,
the speed-reducer housing includes a seal member positioning portion configured to come into contact with the seal member from the worm wheel-side to position the seal member, and
a clearance is provided in the axial direction between the seal member and the first bearing.

5. The electric power steering system according to claim 1, wherein
a first bearing serving as the bearing is disposed between the worm wheel and the pinion gear,
the electric power steering system further comprises:
a second bearing disposed on an opposite side of the worm wheel from the first bearing; and
a preload applying mechanism configured to apply a preload to the first bearing and the second bearing,
each of the first bearing and the second bearing includes an outer ring and an inner ring, the outer ring being internally fitted to the speed-reducer housing, and the inner ring being externally fitted to the pinion shaft in a state where movement of the inner ring relative to the pinion shaft in an axial direction is restricted,
the preload applying mechanism includes an outer ring positioning portion and an urging member, the outer ring positioning portion being provided in the speed-reducer housing, the outer ring positioning portion being configured to come into contact with the outer ring of the second bearing from an opposite side of the second bearing from the worm wheel, the urging member being held by the speed-reducer housing, and the urging member being configured to come into urging contact with the outer ring of the first bearing from the pinion gear-side,
the seal member is disposed between the worm wheel and the first bearing,
the speed-reducer housing includes a seal member positioning portion configured to come into contact with the seal member from a worm wheel-side to position the seal member, and
a clearance is provided in the axial direction between the seal member and the first bearing.

6. The electric power steering system according to claim 1, wherein:
the bearing is a single bearing supporting the pinion shaft in the speed-reducer housing;
the bearing includes an outer ring and an inner ring, the outer ring being internally fitted to the speed-reducer housing, and the inner ring being externally fitted to the pinion shaft in a state where the inner ring is positioned in an axial direction;
the speed-reducer housing includes an outer ring positioning portion having an annular shape, the outer ring positioning portion configured to come into contact with the outer ring from a worm wheel-side; and
the seal member is disposed in a clearance between the pinion shaft and the outer ring positioning portion of the speed-reducer housing, the seal member being configured to seal the clearance.

7. An electric power steering system comprising:
a rack shaft connected to steered wheels;
a rack housing configured to accommodate the rack shaft;
a pinion shaft provided with a pinion gear meshed with a rack gear of the rack shaft;
a speed-reducer including a worm wheel and a worm shaft, the worm wheel being connected to a portion of the pinion shaft such that the worm wheel is rotatable together with the pinion shaft in an integrated manner, the portion of the pinion shaft protruding from the rack housing, and the worm shaft being meshed with the worm wheel;
an electric motor configured to rotationally drive the worm shaft;
a speed-reducer housing having an insertion hole through which the pinion shaft passes, the insertion hole facing an inside of the rack housing, and the speed-reducer housing being configured to accommodate the speed-reducer;
a bearing including an outer ring and an inner ring, the outer ring being internally fitted to an inner peripheral surface of the speed-reducer housing in the insertion hole, the inner ring being externally fitted to the pinion shaft, and the bearing being configured to support the pinion shaft in the insertion hole such that the pinion shaft is rotatable;
a plug having an annular shape, the plug being screwed to the inner peripheral surface of the speed-reducer housing in the insertion hole to surround the pinion shaft, and the plug being configured to come into contact with the outer ring from the pinion gear-side; and
a seal member having an annular shape, the seal member being configured to seal a clearance between the pinion shaft and the plug.

8. The electric power steering system according to claim 7, wherein: the bearing is a single bearing supporting the pinion shaft in the speed-reducer housing;
the speed-reducer housing includes an outer ring positioning portion configured to come into contact with the outer ring from the worm wheel-side;
the plug includes a seal member positioning portion configured to come into contact with the seal member from the pinion gear-side; and
a clearance is provided in an axial direction between the seal member and the bearing.

9. The electric power steering system according to claim 8, further comprising a liquid gasket disposed in a screwed portion at which the speed-reducer housing and the plug are screwed to each other, in the insertion hole.

10. The electric power steering system according to claim 7, further comprising a liquid gasket disposed in a screwed portion at which the speed-reducer housing and the plug are screwed to each other, in the insertion hole.

11. The electric power steering system according to claim 7, wherein
a first bearing serving as the bearing is disposed between the worm wheel and the pinion gear,
the electric power steering system further comprises:
a second bearing disposed on an opposite side of the worm wheel from the first bearing; and
a preload applying mechanism configured to apply a preload to the first bearing and the second bearing,
each of the first bearing and the second bearing includes an outer ring and an inner ring, the outer ring being internally fitted to the speed-reducer housing, and the inner ring being externally fitted to the pinion shaft in a state where movement of the inner ring relative to the pinion shaft in an axial direction is restricted,
the preload applying mechanism includes an outer ring positioning portion and the plug, the outer ring positioning portion being provided in the speed-reducer housing, the outer ring positioning portion being configured to come into contact with the outer ring of the second bearing from an opposite side of the second bearing from the worm wheel, the plug serving as an urging member being configured to come into urging contact with the outer ring of the first bearing from the pinion gear-side,
the plug includes a seal member positioning portion configured to come into contact with the seal member from the pinion gear-side, and
a clearance is provided in the axial direction between the seal member and the first bearing.

12. The electric power steering system according to claim 11, further comprising a liquid gasket disposed in a screwed portion at which the speed-reducer housing and the plug are screwed to each other, in the insertion hole.

* * * * *